United States Patent Office 3,046,317
Patented July 24, 1962

3,046,317
HYDROCRACKING LIQUID ALKANES WITH A CATALYST CONSISTING OF A PLATINUM METAL IN ADMIXTURE WITH BORIA AND ZIRCONIA
John W. Myers, Bartlesville, Okla., assignor to Phillips Petroleum Company, a corporation of Delaware
No Drawing. Filed Mar. 21, 1960, Ser. No. 16,139
12 Claims. (Cl. 260—676)

This invention relates to novel platinum metal catalysts and to the use of said catalysts in the hydrocracking of normally liquid hydrocarbons.

The hydrocracking of hydrocarbons using platinum on alumina-boria is a conventional process. It has been discovered that the substitution of zirconia for alumina in such a catalyst greatly increases the hydrocracking action or activity of the catalyst and also preferentially produces normal compounds.

Accordingly, it is an object of the invention to provide a novel improved hydrocracking catalyst. Another object is to provide novel catalysts for improved hydrocracking of normally liquid hydrocarbons, such as normal alkanes. A further object is to provide an improved process for preferentially hydrocracking normal alkanes to produce normal hydrocarbon compounds. It is also an object of the invention to provide an improved hydrocracking process for hydrocracking normally liquid C–5 and heavier hydrocarbons, such as gasoline stocks, gas oils, and heavier. Other objects will become apparent upon consideration of the accompanying disclosure.

The catalyst of the invention comprises boria and zirconia in admixture with a minor amount of a metal of the group consisting of Pt, Pd, Ir, and Rh. The platinum group metal is utilized in a concentration in the range of about 0.1 to 10 weight percent of the catalyst and the balance comprises from about 2 to 30 weight percent boria and from about 60 to 98 weight percent zirconia. The hydrocracking conditions employed include a temperature in the range of about 400 to 1000° F. and preferably in the range of about 500 to 800° F., a liquid hourly space velocity in the range of about 0.1 to 10 and preferably in the range of about 1 to 5, a pressure in the range of about 100 to 5,000 p.s.i.g. and preferably in the range of about 300 to 2,000 p.s.i.g., and a hydrogen to hydrocarbon mol ratio in the range of about 1 to 20 and preferably in the range of about 2 to 10. The preferred conditions depend upon the specific hydrocarbon or hydrocarbon stock being hydrocracked. Gas oil and heavier liquid hydrocarbons as well as lower molecular weight materials are effectively hydrocracked by the catalyst of the invention. Heavy normally liquid residual hydrocarbons are amenable to cracking with the catalyst using higher pressures in the foregoing ranges. Heavier gasoline stocks are readily hydrocracked under milder conditions than with similar catalysts using other constituents in the support for the platinum metal. The hydrocracking process is applicable to the hydrocracking of $C_5$ and heavier normally liquid hydrocarbon stocks and particularly, to the preferential hydrocracking of normal alkanes to normal hydrocarbons.

The effectiveness of platinum metal deposited on a support consisting essentially of zirconia and boria in hydrocracking a normal alkane to normal hydrocarbons is illustrated in the following example in which normal heptane is subjected to hydrocracking with a control catalyst and with the catalyst of the invention.

EXAMPLE

Catalyst A (control) having the composition 0.4 percent platinum—11.8 percent $B_2O_3$—87.8 percent $Al_2O_3$ was prepared as follows:

A boric acid solution was prepared by adding 33 g. of boric acid to 100 ml. of distilled $H_2O$ and heating on a hot plate. After solution was complete, 75.8 g. of hot aulmina (14–20 mesh) was added to the hot solution and the mixture was heated for 5 minutes at a temperature just below the boiling temperature. The excess solution was then drained off and the granules were dried overnight at 230° F. The material was then calcined by heating to 693° F. in a muffle furnace.

A 100 ml. chloroplatinic acid solution containing 0.9 g. of chloroplatinic acid was prepared. The granules were added to this solution; and after 1 hour, the excess solution was drained off. The drained granules were dried at 230° F. and calcined by heating to 797° F. in a muffle furnace.

Catalyst B (invention) having the composition 0.5 percent platinum—15 percent $B_2O_3$—84.5 percent $Zr_2O_3$ was prepared as follows:

First a zirconia gel was prepared as follows:

A zirconyl nitrate solution was prepared by mixing 220 g. of zirconyl nitrate with 2600 ml. of distilled $H_2O$. An ammonia solution was prepared by mixing 110 ml. of 28–30 percent $NH_4OH$ with 990 ml. of distilled $H_2O$. The ammonia was added rapidly to the nitrate; the gel formed was stirred for 16 minutes and permitted to stand for 34 minutes. The gel was then heated in a steam bath for about 3 hours and then filtered with suction. The filtered gel was dried under infrared lamps overnight and then dried further in a 220° F. forced draft drying cabinet. After drying, the gel was washed 10 times in 500 ml. portions of distilled $H_2O$. The washed gel was then dried in a 220° F. forced draft drying cabinet.

A boric acid solution was prepared by adding 23 g. of boric acid to 70 ml. distilled $H_2O$ and heating. Then 81.8 g. of the above zirconia gel was heated and added to the boric acid solution. The mixture was heated at just below boiling temperature for 28 minutes. The excess solution was drained off and the granules were dried at 230° F.

A 70 ml. chloroplatinic acid solution containing 1 g. of chloroplatinic acid was prepared. The granules were added to this solution, and after 30 minutes, the excess solution was drained off. The drained granules were dried at 230° F. and calcined by heating in dry air at 930° F.

Table I

|  | Catalyst A | | Catalyst B | |
| --- | --- | --- | --- | --- |
| Time in hours (run) | 2.0 | 2.0 | 1.5 | 1.5 |
| Temperature, F. (Avg.) | 647 | 680 | 505 | 605 |
| Liquid hourly space velocity | 1.2 | 1.2 | 1.0 | 1.0 |
| Pressure, p.s.i.g. | 300 | 300 | 300 | 300 |
| Hydrogen/hydrocarbon mol ratio | 2 | 2 | 2 | 2 |
| Product Composition, wt. percent: | | | | |
| Methane | 0.01 |  | 1.0 | 1.6 |
| Ethane | 0.04 | 0.06 | 0.8 | 1.8 |
| Propane | 0.30 | 2.40 | 3.4 | 9.0 |
| iso-Butane | 0.40 | 2.64 | 0.1 | 0.4 |
| Normal-butane | 0.86 | 0.95 | 5.5 | 26.2 |
| iso-Pentane | 0.01 | 0.03 | 0.0 | 0.9 |
| Normal-pentane | 0.04 | 0.00 | 2.1 | 12.0 |
| iso-Hexane | 0.00 | 0.10 | 0.0 | 2.4 |
| Normal-hexane | 0.20 | 0.10 | 5.9 | 13.0 |
| Heptanes and heavies | 98.14 | 93.72 | 81.2 | 32.7 |

The catalyst of the invention may be prepared in other ways than that set forth in the foregoing example which illustrates a preferred method to be employed. The invention is not limited to the particular method of preparing the catalyst, it being essential to provide an intimate mixture of the boria and zirconia and distending or distributing the platinum metal over the surface of the support material as by impregnating the porous support mixture with an aqueous solution of a platinum metal compound which is readily convertible to the metal by heating and reduction.

The foregoing example shows that catalyst B of the invention is much more active in hydrocracking normal heptane, even at substantially milder hydrocracking conditions, than the control catalyst A in which alumina occurs in place of zirconia. This is evidenced by the substantially lower percentage of heptanes and heavier hydrocarbons in the product from catalyst B than in the product from catalyst A. The substantially higher content of n-butane, and n-pentane, and n-hexane, in the product from catalyst B clearly illustrates the effectiveness of said catalyst in hydrocracking a normal alkane to normal hydrocarbon compounds. The second runs under catalyst A and catalyst B offer the best comparison of the activities of the catalyst since there is only a 75° difference in temperature in favor of catalyst A. The conversion to lighter products, principally normal paraffins, for catalyst A was only 6.28 weight percent as compared with a conversion of 67.3 percent for catalyst B and this 10 fold increase in conversion is effected at a 75° lower temperature.

Certain modifications of the invention will become apparent to those skilled in the art and the illustrative details disclosed are not to be construed as imposing unnecessary limitations on the invention.

I claim:

1. A catalyst consisting essentially of boria and zirconia in admixture with from 0.1 to 10 weight percent of a metal of the group consisting of Pt, Pd, Ir, and Rh.
2. The catalyst of claim 1 wherein said catalyst consists essentially of boria in the range of 2 to 30 weight percent, zirconia in the range of 60 to 98 weight percent of said catalyst, and the balance said metal.
3. The catalyst of claim 2 wherein said metal is Pt.
4. The catalyst of claim 2 wherein said metal is Pd.
5. A process for hydrocracking a normally liquid normal alkane having at least 5 carbon atoms per molecule comprising contacting said alkane admixed with hydrogen under hydrocracking conditions with a catalyst consisting essentially of a platinum metal in an amount in the range of 0.1 to 10 weight percent of the catalyst in admixture with boria and zirconia so as to hydrocrack said alkane.
6. The process of claim 5 wherein said catalyst consists essentially of boria in the range of 2 to 30 weight percent, zirconia in the range of 60 to 98 weight percent, and the balance platinum metal.
7. The process of claim 6 wherein said platinum metal is Pt.
8. The process of claim 6 wherein said platinum metal is Pd.
9. A process for hydrocracking $C_5$ and heavier normally liquid hydrocarbons comprising contacting said hydrocarbons in admixture with hydrogen under hydrocracking conditions with a catalyst consisting essentially of from 0.1 to 10 weight percent of a metal of the group consisting of Pt, Pd, Ir, and Rh in admixture with boria and zirconia so as to hydrocrack said hydrocarbons.
10. The process of claim 9 wherein hydrocracking conditions include a temperature in the range of 400 to 1000° F., a space velocity in the range of 0.1 to 10.0 l.v.h., a pressure in the range of 100 to 5000 p.s.i.g., and a $H_2$ to hydrocarbon mol ratio in the range of 1 to 20, said boria being in the range of 2 to 30 weight percent and said zirconia being in the range of 60 to 98 weight percent of said catalyst.
11. The process of claim 9 wherein said metal is Pt.
12. The process of claim 9 wherein said metal is Pd.

References Cited in the file of this patent

UNITED STATES PATENTS

| | | |
|---|---|---|
| 2,625,504 | Haensel et al. | Jan. 13, 1953 |
| 2,888,397 | Burton et al. | May 26, 1959 |
| 2,897,135 | Doumani | July 28, 1959 |
| 2,911,357 | Meyer et al. | Nov. 3, 1959 |